US012420329B2

(12) United States Patent
Bauersachs et al.

(10) Patent No.: US 12,420,329 B2
(45) Date of Patent: Sep. 23, 2025

(54) FORGING MACHINE WITH PRESTRESSED CONCRETE MACHINE FRAME

(71) Applicant: Langenstein & Schemann GmbH, Coburg (DE)

(72) Inventors: Lothar Bauersachs, Weidhausen (DE); Harald Barnickel, Coburg (DE)

(73) Assignee: LANGENSTEIN & SCHEMANN GMBH (DE)

( * ) Notice: Subject to any disclaimer, the term of this patent is extended or adjusted under 35 U.S.C. 154(b) by 408 days.

(21) Appl. No.: 17/961,780

(22) Filed: Oct. 7, 2022

(65) Prior Publication Data

US 2023/0110046 A1 Apr. 13, 2023

(30) Foreign Application Priority Data

Oct. 8, 2021 (DE) ..................... 10 2021 126 126.0

(51) Int. Cl.
*B30B 15/04* (2006.01)
*B21J 9/10* (2006.01)
*B21J 13/04* (2006.01)

(52) U.S. Cl.
CPC ................. *B21J 9/10* (2013.01); *B21J 13/04* (2013.01); *B30B 15/04* (2013.01); *B30B 15/042* (2013.01)

(58) Field of Classification Search
CPC ......... B30B 15/04; B30B 15/042; B30B 1/34; B21J 9/10; B21J 13/03; B21J 13/04; B21J 9/02; B21J 9/20; E02D 27/44; Y10T 29/49758
See application file for complete search history.

(56) References Cited

U.S. PATENT DOCUMENTS 1,907,083 A 5/1933 Meyercord
2,799,187 A 7/1957 Dusen
(Continued)

FOREIGN PATENT DOCUMENTS

| | | | | |
|---|---|---|---|---|
| DE | 1575278 | | 2/1967 | |
| DE | 102013108299 A1 | * | 2/2015 | ........... B30B 15/042 |
| WO | 2013/023888 | | 2/2013 | |

OTHER PUBLICATIONS

Machine translation of DE 10 2013 108 299 A1, 12 pages (Year: 2025).*

*Primary Examiner* — Jimmy T Nguyen
(74) *Attorney, Agent, or Firm* — Workman Nydegger

(57) ABSTRACT

A forging machine includes a first tool carrier and a second tool carrier, a drive system for driving the first tool carrier in a working movement, a machine frame, wherein the machine frame is formed of a concrete prestressed with prestressing elements, wherein the machine frame comprises a frame base and a frame support connected to the frame base, wherein longitudinal prestressing elements are provided which extend parallel to the central axis (M) and each extend through the frame support, the frame base, and through the cross-member, wherein transverse prestressing elements are provided both in the frame base and in the cross-member, wherein the longitudinal prestressing elements and the transverse prestressing elements include prestressing anchors, and wherein the prestressing anchors are each arranged on an outer surface of the frame base or the cross-member.

23 Claims, 4 Drawing Sheets

(56) References Cited

U.S. PATENT DOCUMENTS

| | | | | | |
|---|---|---|---|---|---|
| 4,064,734 | A * | 12/1977 | Pahnke | B21J 13/04 | 72/455 |
| 2012/0153244 | A1 * | 6/2012 | Sczesny | B30B 15/042 | 254/199 |
| 2014/0116104 | A1 * | 5/2014 | Bauersachs | B30B 15/042 | 72/21.4 |

* cited by examiner

FORGING MACHINE WITH PRESTRESSED CONCRETE MACHINE FRAME

CROSS-REFERENCE TO RELATED APPLICATIONS

The present invention claims the benefit of priority to German Patent Application No. 10 2021 126 126.0, filed on Oct. 8, 2021, the entire content of which is incorporated herein by reference.

DESCRIPTION

The invention relates to a forging machine (or: a forging unit) for forging workpieces.

The forging of (mostly solid) workpieces made of metallic materials, for example iron, steel or aluminium materials, is usually carried out at relatively high temperatures. Forgeable materials basically include all kneadable metals and metal alloys. These can be ferrous materials and alloys such as steels, as well as non-ferrous metals such as magnesium, aluminium, titanium, copper, nickel, vanadium and tungsten and alloys thereof. The high forging temperatures achieve the required formability of the workpiece and flowability of the material. The temperatures that usually occur during forging are between 550° C. and 750° C. in the case of semi-hot forging and are above 900° C. in the case of so-called hot forging, depending on the forged material, and in the area of room temperature in the case of cold forging.

Various forging machines are known for forging solid metal forgings, including percussive forging machines such as forging hammers and percussive forging presses such as screw presses and non-percussive forging machines such as hydraulic forging press machines, forging rolling machines and electric upsetting machines. At least one tool carrier (or: ram or bear) with a first forming tool of the forging machine is driven by a drive and moved towards and away from each other, usually in a straight line, relative to a second forming tool on a second tool carrier. Between the forming tools, the workpiece located in a working area is forged by applying forming forces and forming energy. Such forging machines usually operate cyclically. In die forging, shaping dies are used as forming tools into whose cavities or engravings the material of the workpiece flows.

Forging machines have machine frames (or: machine base, machine support structure) which usually comprise, especially in the case of a forging hammer or a forging press such as a screw press or hydraulic press, a frame base (or: frame lower part) on which a lower forming tool is located, and one or more uprights extending upwards from the frame base, on which the ram or bear with the upper forming tool is guided. The frame base is also called a shabotte in the case of a forging hammer and a press table in the case of a forging press. The frame may be U-shaped or C-shaped, in particular in vertical views, i.e. in the form of a frame open at the top or one side, or O-shaped, i.e. in the form of a closed frame. The machine frame of the forging machine can be formed in one piece or in several pieces. On the upper side of the uprights, there is usually a head part, also called a cross-member or crosshead, which comprises the drive for the ram or bear, for example a hydraulic and/or electric drive. The head part can be provided as a separate component or also integrated in the frame.

Machine frames of forging machines are usually made of iron materials, especially grey cast iron or steel materials, because these have very good material properties for this application. Lasco Umformtechnik GmbH has been producing hydraulic press machines for massive forming for many years (https://www.lasco.com/images/pdfs/prospekte/de/UT_Hydraulische_Pressen_2018_D.pdf), which have machine frames made of ferrous materials.

In https://de.wikipedia.org/wiki/Mineralguss and the books cited there Utz-Volker Jackisch, "Mineralguss für den Maschinenbau—Eigenschaften, Engineering, Verarbeitung und industrielle Anwendung eines modernen Werkstoffs für hochpräzise Maschinengestelle", Verlag Moderne Industrie, Landsberg/Lech 2015, ISBN 978-3-86236-082-6 and Utz-Volker Jackisch, Martin Neumann, "Maschinengestelle für hochdynamische Produktionstechnik", Süddeutscher Verlag onpact, Munich 2014, ISBN 978-3-86236-069-7, mineral cast concrete, a resin-bonded concrete, is suggested as a material for machine frames for filling steel shells, and ultra-high performance concrete (UHPC), especially for vibration damping. The binder in mineral cast is epoxy resin, fillers or aggregates are usually mineral materials such as gravel. Machines for which such machine frames with mineral casting are suitable are mentioned in this proposal according to the state of the art machine tools such as tool grinding machines or 5-axis milling machines or 5-axis universal machining centres and machines for electronics manufacturing, laser machining, woodworking, textile manufacturing and measuring and testing machines.

From U.S. Pat. No. 2,799,187 A a forging press machine is known having a machine frame with a base (or: bottom plate), laterally spaced beams and a top plate, the top plate having a monolithic structure made of reinforced concrete and extending between the beams above the base. Attached to the underside of the top plate, which may be referred to as the crossbar, are working cylinders projecting into the working space with the upper press tools held in place by cables passing up through the crossbar via fasteners and tensioned or released by winches. The lower press tools are arranged on the base. The side beams are designed as continuous walls, so that the side beam walls and the base as well as the cross-member define a front access opening through which the working space is accessible. Both the crossbar and the base comprise two reinforcing steel elements orthogonal to each other and running horizontally, embedded in the concrete and set under pre-stress in the direction of compression in the horizontal plane. The crossbar also carries hydraulic components to drive the working cylinders for the upper press tools. The side beams or beam walls have no reinforcing elements or tensioning elements. Furthermore, there are no vertically extending tensioning elements or reinforcing elements in the base and in the crosshead. The mass of the crossbar with the components attached to it is greater than the maximum working forces.

DE 15 75 278 A1 discloses a machine frame made of prestressed concrete for hydraulically operating pressing or drawing devices. The machine frame comprises a core storing the tensioning forces and a casing structure homogeneously connected to the core, whereby a winding of high-strength steel wire or steel strip generating the tension in the press body lies between the core and the casing structure. The steel wire or steel strip winding generating the stress in the concrete is placed around the core before pouring and is prestressed until the magnitude of the prestress is higher than the maximum working force allowed later. The winding can also be embedded in an encasing tube that is subsequently cast with concrete compound. Furthermore, the winding can be a one-piece helical winding or consist of a plurality of individual windings. The core consists in particular of two core pieces, the surfaces of which facing each other have devices for receiving the pressing tools. The winding runs in particular within lateral supports of the machine frame, which extend upwards from the machine frame base and are there transversely connected to one another via a cross-member, the base, lateral supports and cross-member delimiting a working space in which the pressing tools are arranged. Sliding plates are provided at the deflection points of the steel wires in order to improve the sliding of the wires when applying the pre-tensioning forces.

From U.S. Pat. No. 1,907,083 A a pressing machine is known with a machine frame which surrounds a working space with a plurality of upper pressing tools and lower pressing tools and is formed of reinforced concrete. The upper pressing tools are driven by individual drives. The machine frame comprises a semi-cylindrical base made of steel-reinforced concrete and a likewise semi-cylindrical upper part (or: a cross-member) also made of steel-reinforced concrete, which are connected to each other by two side parts or side beams. Two opposite flat sides of the base and the cross-member as well as the side parts delimit a working space in which the tools and the drive elements are arranged. Individual reinforcing bars embedded in the concrete are provided in the form of endless loops, which run semi-circularly in the base and in the top part and run vertically in a straight line in the side parts. Furthermore, in the base and in the upper part, vertically running additional reinforcing bars are embedded in the concrete, which are welded to the reinforcing bars running all around as endless elements. In one embodiment, tubes are provided in the cross-member as vertical reinforcing elements, which run vertically in a straight line and are also provided for tensioning the drive cylinders arranged below the cross-member via corresponding tensioning anchors on the upper side of the cross-member. The reinforcing rods, which run all around in the form of endless loops or windings, are arranged in particular in matrix form or in several layers. The reinforcing rods running in endless loops or windings enclose the working space enclosed by the machine frame.

From WO 2013/023888 A1 a machine foundation made of reinforced concrete for forging machines, in particular hydraulic presses, is known.

BRIEF SUMMARY

The invention is now based on the task of providing a new machine frame for a forging machine, in particular for a hydraulic forging press.

This task is solved in particular by a forging machine with a new machine frame (or: machine base) according to embodiments according to the invention, in particular according to patent claim 1.

In the embodiment according to claim 1, a forging machine, preferably a forging press machine, for forging workpieces comprises a. a first tool carrier and a second tool carrier, b. a drive system for driving at least the first tool carrier in a working movement along a, preferably vertical, central axis towards or away from the second tool carrier, c. and a machine frame on which the drive system and preferably also the second tool holder are held, d. wherein the machine frame is formed at least predominantly of a concrete prestressed with prestressing elements, e. wherein the machine frame comprises a frame base and a frame support connected to the frame base, preferably extending upwards from the frame base, in particular vertically, as well as a cross-member (or: head member) connected with the frame support and arranged on a side of the frame support facing away from the frame base, f. wherein longitudinal prestressing elements are provided which extend at least predominantly (or for the most part) parallel to the central axis and each extend through the frame support and also through the frame base and through the cross-member, g. wherein transverse prestressing elements are provided both in the frame base and in the cross-member, each of which is at least predominantly orthogonal to the longitudinal prestressing elements, h. wherein the longitudinal prestressing elements and the transverse prestressing elements, in particular at their ends, are each provided with prestressing anchors for the application of a respective associated prestressing force or bias, and i. wherein the prestressing anchors are each arranged on an outer surface of the frame base (11) or the cross-member.

In one embodiment, the second tool carrier is arranged on or at the base of the frame and can optionally be adjusted to a desired position by means of a holding and positioning device and, if necessary, a measuring device. The frame base can stand or rest on a machine foundation or be connected to it. In particular, the frame base is at least approximately in the form of a straight prism with a polygonal base, especially a cuboid.

The cross-member is preferably at least approximately in the form of a straight prism with a polygonal base, in particular cuboid.

The first tool carrier is preferably held on or at the frame support and/or guided for the working movement, but can also alternatively or additionally be held on the cross-member and/or guided for the working movement.

Preferably, the transverse prestressing elements are also arranged at least partially orthogonal to each other. In a preferred embodiment, the transverse prestressing elements in the frame base or in the cross-member or in the frame base and in the cross-member are divided into at least two groups or subsets of transverse prestressing elements, wherein the transverse prestressing elements of one group extend at least predominantly orthogonally or in at least approximately orthogonal preferred directions, in each case crossing the transverse prestressing elements of the other group.

In a particularly advantageous embodiment, the transverse prestressing elements are arranged in the frame base or in the cross-member or in the frame base and in the cross-member in several (at least two or more) planes, the planes preferably being directed perpendicularly to the central axis.

Preferably, the transverse prestressing elements in one of the planes now run at least predominantly orthogonally or in at least approximately orthogonal preferred directions, while crossing the transverse prestressing elements in at least one adjacent plane or two adjacent planes. In particular, the above-mentioned groups of mutually orthogonal transverse prestressing elements alternate in the superimposed or successive planes.

The prestressing elements or their cross-sections are preferably arranged at least partially in a matrix shape. In a particularly advantageous embodiment, at least some of the longitudinal prestressing elements each pass through an intermediate space formed between two transverse prestressing elements in a respective first one of the planes and two transverse prestressing elements in a respective plane adjacent to the first plane, and/or at least some of the transverse prestressing elements in a first one of the planes pass through an intermediate space formed between two transverse prestressing elements in two respective planes adjacent to the first plane and two longitudinal prestressing elements.

The cross-sections of the longitudinal prestressing elements and/or the transverse prestressing elements are preferably arranged substantially uniformly distributed over the corresponding cross-section of the machine frame. The density of the prestressing elements, i.e. the sum of the cross-sectional areas in relation to the total cross-sectional area of the respective frame section, is generally selected depending on the desired pretension and tensile strength of the prestressing elements and/or is selected between 0.1% and 10%.

The mass ratio of concrete on the one hand and prestressing elements on the other is generally chosen between 0.5% and 15%, in particular between 0.8% and 2.5%.

In a particularly advantageous embodiment, for which the said arrangements of the prestressing elements according to the invention are particularly advantageous, the pretension and arrangement of the prestressing elements are calculated by computer-aided simulations of the reaction forces during the forging process, wherein the prestressing elements are provided in particular in such a thickness and density and arrangement and are individually prestressed by means of the prestressing anchors in such a way that the tensile stresses or deformations in the machine frame acting on the concrete during the forging operations determined during the simulation are at least largely or even completely avoided, so that the concrete is only loaded in compression.

Preferably, the respective pretension of the prestressing elements is adjusted according to pre-set values within the framework (or: process, context) of pre-tensioning, in particular individually via the associated pretensioning anchors. Furthermore, the pretension can also be adjusted subsequently in the framework (or: process, context) of post-tensioning and/or monitored or continuously measured by means of measuring devices.

The prestressing elements are preferably formed at least predominantly from a steel material. Preferably, wire ropes are provided for at least some or all of the prestressing elements, which are formed from a plurality of wires guided together, preferably of a metallic material such as steel. A wire rope may comprise in particular a plurality of strands, for example 3 to 80, which may be parallel to one another or also twisted to one another, in particular about a central core, each strand preferably comprising a plurality of individual wires, for example 3 to 245, in particular 7 to 19, the wires preferably being twisted, in particular about a central insertion of the strand.

In a particularly advantageous embodiment, the frame support has several, in particular four, uprights extending upwards from the frame base, preferably at its corner regions.

Preferably, longitudinal prestressing elements run through each upright, but preferably no transverse prestressing elements.

In a further embodiment, at least three groups of prestressing elements run in three associated and mutually different, preferably mutually orthogonal, group directions through the concrete of the machine frame or of a part thereof, in particular of the frame base and/or of the frame support, in particular of the upright or uprights, one of the group directions preferably running parallel to the central axis and the other two group directions preferably running orthogonally to the central axis.

The frame support or the uprights are preferably arranged around a working space, which is preferably bounded (or: delimited) upwards by the first tool carrier and downwards by the second tool carrier. The working space is preferably adjoined by side spaces, viewed from the central axis outwards, which are each arranged between two of the uprights. The outer contour of the first tool carrier in particular is now adapted to the shape of the working space and the adjoining side spaces and projects partially into the side spaces.

In one embodiment, the uprights have, preferably flat, inner surfaces facing the central axis or corners of the second tool carrier and delimiting the working space and preferably arranged at the same distance from the central axis and preferably arranged on a straight prism with a regularly polygonal, preferably square or octagonal, base around the central axis.

Preferably, further, preferably flat, inner surfaces of the uprights adjoin on both sides of the inner surfaces pointing to the central axis, preferably each at an obtuse angle, e.g. 135°.

It is expedient that the uprights are each at least approximately in the form of a straight prism, preferably with a pentagonal horizontal base and/or with two vertical outer surfaces, preferably arranged at right angles to one another and/or preferably extending upwards in continuation of side surfaces of the base of the frame, and three vertical inner surfaces.

Generally, the uprights are connected and stiffened by the cross-member.

Now, in an advantageous embodiment, drive units of the drive system are arranged or held on the underside of the cross-member, preferably via a carrier plate, and are coupled to the first tool carrier, preferably with the drive units and/or the carrier plate projecting at least partially outwards into the side spaces between the uprights.

It is particularly advantageous if fastening devices for the drive units are accessible and fixable or detachable on a cross-member upper side of the cross-member, wherein the fastening devices run, preferably vertically, through the cross-member and are preferably formed with traction elements such as traction cables with clamping elements or traction rods with threads and fastening nuts, wherein the drive units can be removed downwards together with the associated fastening device by loosening the fastening devices, in particular the fastening nuts or clamping elements.

In a particularly preferred embodiment, parts of the machine frame, such as, for example, the frame base, the uprights and/or the cross-member, or the entire machine frame are produced from a flowable or pasty and subsequently hardening concrete mixture of binder and fillers (or: aggregates, additives) and mixing liquid, generally water, and possibly additives such as superplasticiser or setting accelerator. The binder is at least a hydraulic binder, preferably cement, and/or at least a latent hydraulic binder and/or at least a non-hydraulic binder such as a synthetic resin. In particular, mineral grains such as sand and gravel and chippings or recycled materials of sufficient strength are provided as fillers. Preferably, the concrete for the machine frame is designed as reinforced concrete with reinforcement elements, in particular made of steel or solid plastics or carbon, and/or added fibres made of steel, plastic or glass or mats or woven or knitted fabrics.

Expediently, individual frame parts or sections of the machine frame, such as, for example, the frame base, the uprights and/or the cross-member are prefabricated parts that have been connected to each other, in particular monolithically at the installation site, with connecting concrete and/or the prestressing elements and/or connecting elements.

The concrete of the machine frame preferably contains guide channels and receptacles for the prestressing elements, e.g. tubes or corrugated tubes.

BRIEF DESCRIPTION OF THE FIGURES

The invention is further described below by means of examples of embodiments and with reference to the drawings. They show in each case in a schematic representation.

DETAILED DESCRIPTION

Figure 1:
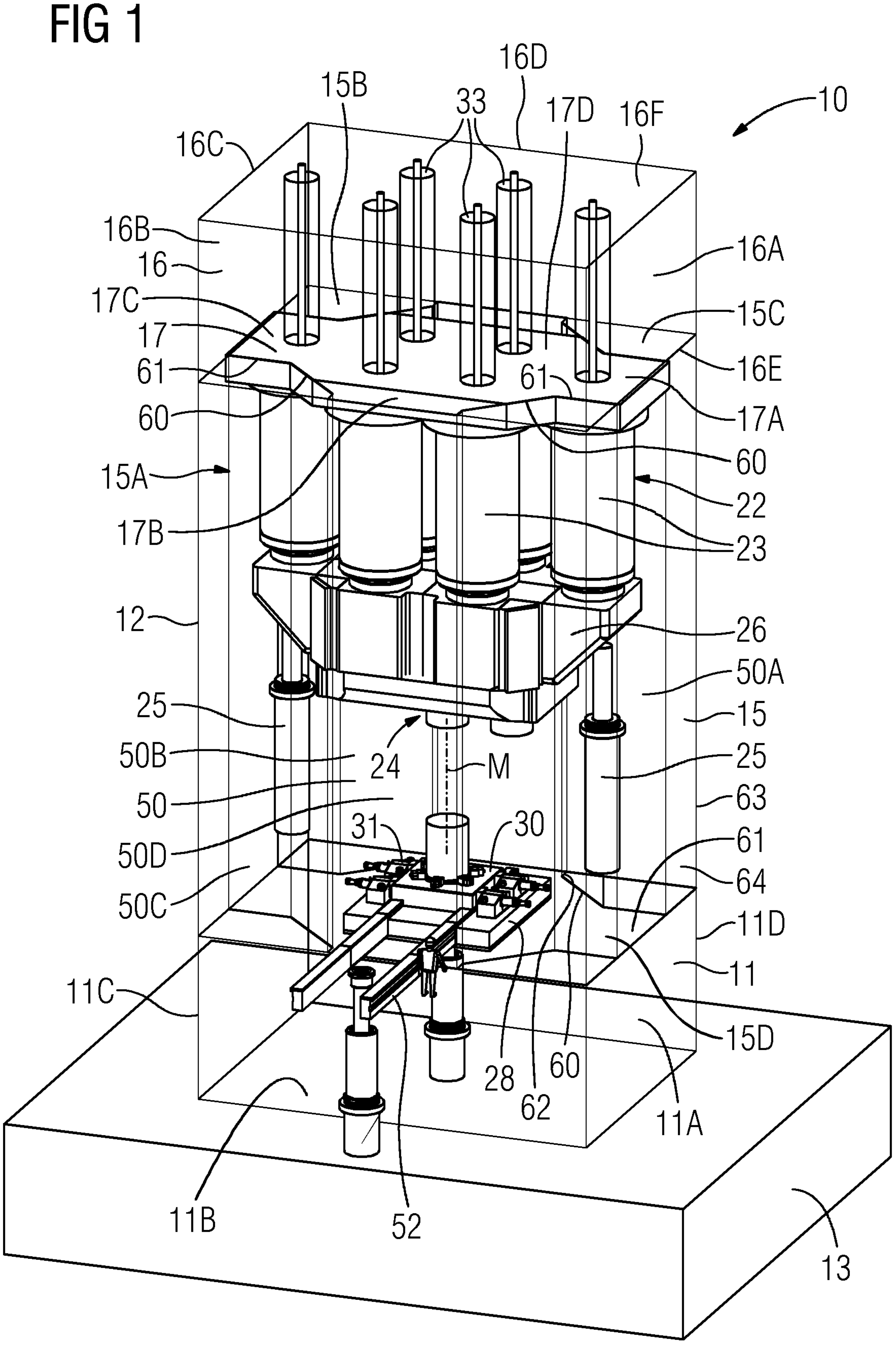
FIG. 1 a forging machine with a machine frame according to the invention in a perspective view, FIG. 2 a machine frame according to the invention, particularly suitable for the forging machine of FIG, in a partially cut front view, FIG. 3 the machine frame according to FIG. 2 in a partially cut side view and FIG. 4 the machine frame according to FIGS. 2 and 3 in a partially cut top view.

Corresponding parts and sizes are marked with the same reference signs in the drawings.

In the embodiments, the forging machine 10 for forging metallic workpieces is disclosed as a hydraulic press machine (or press for short) comprising a machine frame 12 according to the invention.

However, a machine frame according to the invention is not limited to hydraulic press machines, but can also be used with other forging machines, for example with electromotive presses such as screw presses or linear drive presses, or with, in particular, hydraulically or electromotively driven forging hammers or with rolling machines or with electric upsetting machines or also with press machines for cold forming of sheet metal or also lime-sand brick presses.

The machine frame 12 of the forging machine comprises a frame base 11, which stands on or is connected to a machine foundation 13, and a frame support 15 extending upwards from the frame base 11, on or from which a drive system 22 for an upper first tool carrier 26 is mounted or supported. Mounted to the first tool carrier 26 is at least one first forming tool 24, which is not visible in the figures. A lower second tool carrier 28 is arranged on the frame base 11. At least one second forming tool 30 is mounted on the second tool carrier 28 and is adjustable to a desired position by means of a holding and positioning device 31 and a measuring device not shown. The forming tools 24 and 30 can have one or more engravings.

The two tool carriers 26 and 28 are movable towards or away from each other by means of the drive system 22 in a linear working movement along a central axis M of the machine frame 12 or the forging machine 10, so that, during a forming movement towards each other, a workpiece—not shown—can be formed or forged between the two forming tools 24 and 30 and, after a return movement of the tool carriers away from each other, the workpiece can be repositioned into another engraving or a new workpiece can be inserted and a new forming operation can take place with repositioned workpiece or new workpiece. As shown, the first tool carrier 26 may be movable relative to the machine frame 12 by the drive system 22 and the second tool carrier 28 may be static or stationary relative to the machine frame 12, or both tool carriers 26 and 28 may be movable relative to the machine frame 12. The central axis M is preferably oriented vertically, i.e. parallel to the earth's gravity, but can also be oriented differently, e.g. horizontally, i.e. perpendicular to the force of gravity.

A transport device 52 is provided for feeding and removing the workpieces.

In the illustrated example embodiment, without limiting the generality, the frame base 11 is formed at least approximately in the shape of a straight prism, in particular a parallelepiped, with four perpendicular side surfaces 11A to 11D arranged at right angles to each other, and the frame support 15 comprises several, in particular four, uprights 15A, 15B, 15C and 15D extending upwards from the frame base 11 at its corner regions where the side surfaces 11A to 11D meet. The uprights 15A to 15D surround a central working space 50 enclosing the central axis M, which is bounded at the top by the first tool carrier 26 and at the bottom by the second tool carrier 28.

Figure 4:
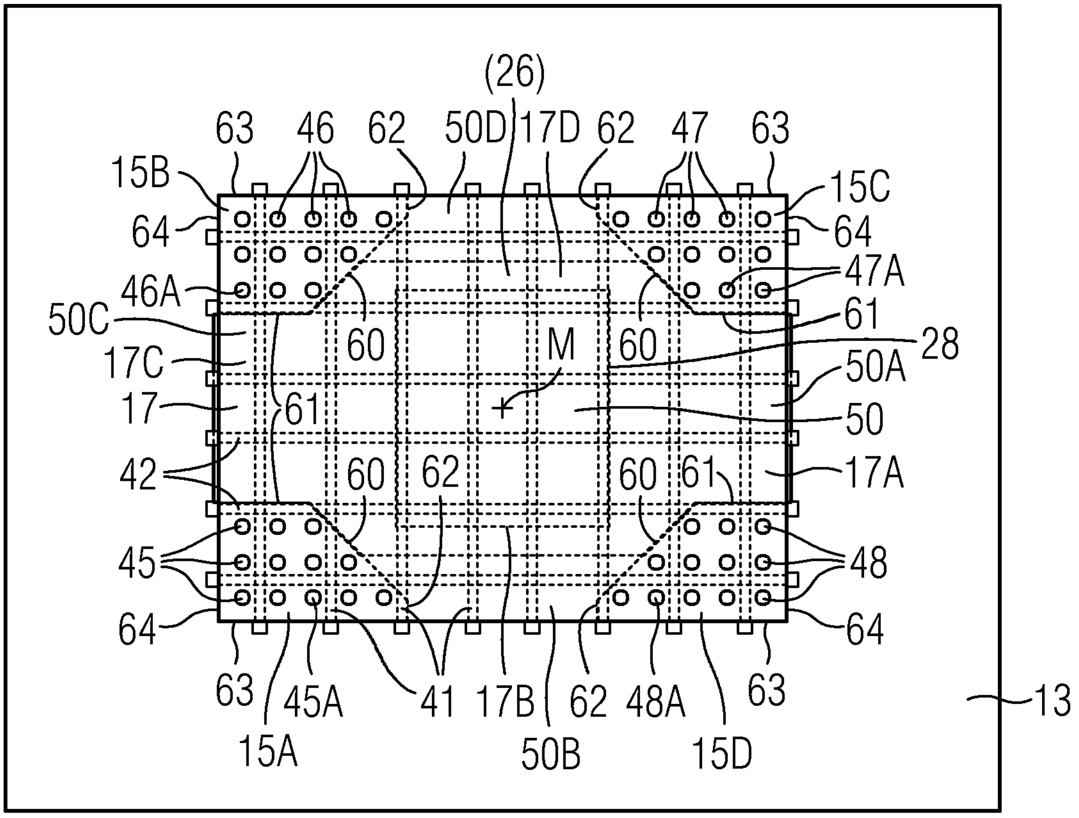

In the illustrated embodiment, as can be seen particularly in FIGS. 1 and 4 and without limiting generality, the uprights 15A to 15D have a shape of a straight prism each having a pentagonal plan or base with two perpendicular outer surfaces 63 and 64 arranged at right angles to each other at the outer corners and three inner surfaces 60, 61 and 62. The outer surfaces 63 extend upwardly in continuation of the front and rear side surfaces 11B and 11D of the frame base 11, and the outer surfaces 64 extend upwardly in continuation of the side side surfaces 11A and 11C of the frame base 11. The inner surfaces 61 extend parallel to the outer surfaces 63 and the inner surfaces 62, which are slightly shorter than the inner surfaces 61, extend parallel to the outer surfaces 64. The inner surface 60 preferably extends between the inner surfaces 61 and 63 at an angle of 45°. The respective inner surfaces 60 or 61 or 62 of opposite uprights extend parallel to each other. The inner surfaces 60 point towards the central axis M and lie on a cuboid around the central axis M at the same distance from the central axis M. Due to the inner edges formed at an obtuse angle, here e.g. 135°, between the inclined inner surfaces 60 and the respective adjoining inner surfaces 61 and 62 of the uprights 15A to 15D, lower local stresses occur at these particularly critical inner edges.

The inner surfaces 60, with imaginary connecting planes between them, delimit the central working space 50 in the form of a primate, for example a straight prism with a regularly octagonal (eight corners or eight edges) base between the uprights 15A to 15D. Side spaces 50A to 50D, which are each arranged between two of the uprights 15A to 15D respectively, adjoin the central working space 50 in a cross shape as seen outwards from the central axis M, namely a side space 50A between the mutually opposing inner surfaces 61 of the uprights 15C and 15D, a side space 50B between the opposing inner surfaces 62 of the uprights 15D and 15A, a side space 50C between the opposing inner surfaces 61 of the uprights 15A and 15B, and a side space 50D between the opposing inner surfaces 62 of the uprights 15B and 15C.

This preferred arrangement and design of the uprights 15A to 15D, in particular their special pentagonal cross-sections, enables a stable and high-strength structure of the machine frame 12.

The first tool carrier 26 is adapted in its outer contour to the shape of the working space 50 and the adjoining side spaces 50A to 50D and projects partially or to some extent into the side spaces 50A to 50D. Preferably, the first tool carrier 26 is guided on the frame support 15, in particular the inner surfaces 60 of the uprights 15A to 15D, via guides not shown in more detail, which are, for example, anchored or embedded in the concrete or fastened by means of fasteners such as steel plates, tension cables or dowels embedded in the concrete.

The lower or second tool carrier 28 has, for example, a square basic shape with side edges running parallel to the side surfaces 61 or 62 and corners pointing towards the side surfaces 60 of the uprights 15A to 15D.

On the side facing away from the frame base 11, in particular the upper side of the frame support 15 or the uprights 15A to 15D, a cross-member 16 is preferably arranged. The cross-member 16 connects the uprights 15A to 15D and thus additionally stiffens the machine frame 12. Similar to the frame base 11, the cross-member 16 is essentially cuboidal in shape with a front side surface 16B and a rear side surface 16D as well as two lateral side surfaces 16A and 16C, wherein in each case a corner region between two side surfaces, e.g. 16C and 16D, on the cross-member underside 16E of the cross-member 16 is connected to one of the uprights 15A to 15D of the frame support 15.

Thereby, a frame-like machine frame 12, preferably vertically aligned, is formed, which encloses a working space 50, with the frame base 11 as a pedestal, four column-like vertical uprights 15A to 15D, between which open side spaces 50A to 50D are formed, via which the working space 50 is accessible from the outside, and the cross-member 16 as a head part arranged on the uprights 15A to 15D.

A support plate 17 is arranged on the underside of the cross-member 16E, which completely covers the central working space 50 and is adapted to the inner surfaces 60 and 61 of the uprights or, more generally, to the inner contour of the side spaces 50A to 50D. The support plate 17 is connected to the uprights 15A to 15D and/or the cross-member 16 and can be cast in particular as a steel or cast-iron part or fastened, for example, by means of cables or screws. The support plate 17 carries on its underside the drive cylinders 23 of the drive system 22, which preferably extend parallel to the central axis M and which in turn are connected at the other end to the first tool carrier 26.

In the illustrated embodiment, without limiting generality, the drive cylinders 23 are adapted in their arrangement to the working space 50 and the side spaces 50A to 50D as well as the support plate sections 17A to 17D, preferably in such a way, that two drive cylinders 23 are arranged side by side at least partly on the two larger or longer front and rear support plate sections 17B and 17D and project at least partly outwards into the front and rear side spaces 50B and 50D, while two further drive cylinders 23 are arranged at least predominantly on the lateral support plate sections 17A and 17C and project at least predominantly into the lateral side spaces 50A and 50C.

Fastening devices 33 for the drive cylinders 23 of the drive system 22 are now accessible and fixable or detachable on the upper side 16F of the cross-member 16. The fastening devices 33 run, preferably vertically, through the cross-member 16 and are formed, for example, with traction elements such as traction cables with clamping elements or traction rods with threads or other connecting elements, whereby a fastening nut is screwed onto the threads in particular and the drive cylinder 23 can be removed downwards together with the associated fastening device 33 by loosening the fastening nut.

Furthermore, hydraulic cylinders 25 can be assigned to the first tool carrier 26 in the lower area, which are provided for lifting or retrieving the first tool carrier 26 after forming.

A machine frame designed in this way can in principle be made of grey cast iron or steel or of another sufficiently strong metallic or non-metallic material in a manner known per se.

In a particularly preferred embodiment according to the invention, however, the machine frame is formed at least predominantly from a prestressed concrete.

For this purpose, parts of the machine frame 12, such as the frame base 11, the uprights 15A to 15D and the cross-member 16, or even the entire machine frame 12 are produced from a flowable or pasty (and subsequently hardening or setting) concrete mixture of binder and fillers (aggregates, admixtures) and usually also liquid (mixing liquid), usually water, and possibly additives such as superplasticiser or setting accelerator or the like.

The flowable concrete mixture is poured or filled, if necessary in several successive partial steps and preferably from the bottom to the top, into a mould or a predetermined volume, in particular within a formwork which is designed according to the desired shape of the frame part or section, and then hardens (or: sets). Afterwards, the mould or casing can be removed again.

Polyhedral outer shapes and flat outer surfaces for the frame parts formed from concrete, such as those chosen in the example embodiments for the frame parts 11, 16 and 15A to 15D as well as 17, are particularly advantageous in this respect because they enable simple shuttering with flat shuttering elements or panels.

The concrete can in particular be one of the already mentioned known concretes. An overview of common concretes can also be found at https://de.wikipedia.org/wiki/Liste_gebr%C3A4uchlicher_Betone.

As a binder, generally at least one hydraulic binder, preferably cement, is used and/or at least one latent hydraulic (pozzolanic) binder, which in each case sets with water of the mixing liquid. However, at least one non-hydraulic binder, such as a synthetic resin, can also be used additionally or alternatively. In particular, mineral grains such as sand and gravel and grit or recycled materials of sufficient strength can be used as fillers or aggregates.

The European standard EN 197/1:2000 provides an overview of so-called normal cements or CEM cements with their constituents. According to EN 197-1, cement is a hydraulic binder and a finely ground inorganic substance that, when mixed with water, produces cement paste. The cement paste solidifies and hardens through hydration and, as a binder matrix in the concrete, remains solid and space-resistant even under water after hardening. According to EM 197/1:2000, the normal cements are divided into five main types of cement, which differ in their main constituents, namely Portland cement (CEM I), Portland composite cements (CEM II), blastfurnace cements (CEM III), pozzolanic cements (CEM IV) and composite cements (CEM V). The variously added main constituents of the cement are in particular granulated blastfurnace slag, silica, pozzolana, fly ash, burnt shale and limestone, and influence the hydration rate, the resistance to chemical substances and also the workability of the flowable cement and the strength of the hardened cement.

In synthetic resin-bonded (or: reaction resin-bonded) concretes such as synthetic resin concrete or polymer concrete, the binder used is at least partly a flowable synthetic resin such as an epoxy resin, which hardens chemically.

High-strength concretes with a dense and compression-resistant binder matrix between the filler or aggregate particles are preferred.

The concrete for the machine frame 12 is preferably, especially to increase its tensile strength, in a composite material or as reinforced (or: armoured) concrete with reinforcing elements (or: armouring elements), especially as reinforced concrete with reinforcing elements of steel or solid plastics or carbon or, by the addition of fibres of steel, plastic or glass, or in combination with mats or woven or knitted fabrics.

The frame parts or sections of concrete can be produced at the installation site of the machine frame or also transported to the installation site as prefabricated parts and connected to each other there, in particular monolithically with connecting concrete and/or the prestressing elements and/or connecting elements.

Already during the movement of the first tool carrier 26, but especially during the forming of the workpieces, considerable reaction forces occur in the dynamic behaviour in the machine frame in addition to the static forces due to the weights of the frame parts, which result from the forces of motion of the moving and colliding masses (force=mass× acceleration) and can be both local tensile forces and compressive forces.

These dynamic (and also the static) reaction forces are generally calculated in computer-aided simulations. Then, in the volumes or space cells in which tensile forces occurred in the simulation, compensation for the tensile forces is provided, preferably calculated, by means of a prestressing in the machine frame by means of an appropriately adapted arrangement of prestressing elements with specially selected tensile strengths, whereby an advantageous design and distribution and appropriate prestressings of the prestressing elements counteract the reaction forces and the dynamic deformations of the machine frame that would otherwise occur without the prestressing elements. In particular, the prestressing elements are provided in such a thickness, density (sum of the cross-sectional areas of the prestressing elements in relation to the total cross-section) and arrangement that the tensile stresses or deformations in the machine frame which are determined in the simulation during the forming processes and which act on the concrete are at least largely or even completely avoided, so that the concrete is only loaded in compression. Concrete can be loaded very well in compression, but is more sensitive to tension, despite the reinforcement.

An advantageous selection and arrangement of prestressing elements for a machine frame 12 for a forging machine described with reference to FIG. 1 will also be further explained below with reference to FIGS. 2 to 4.

However, the selection and arrangement of the prestressing elements is not limited to this example embodiment, but can be modified depending on the forging machine and forming forces and the shape and material of the machine frame.

During the (partial) production of the machine frame 12 from concrete, passages (guide channels) and receptacles for prestressing elements for prestressing the concrete are preferably kept free, e.g. by pipes or corrugated pipes or similar. If necessary, further components or connecting elements of the forging machine are already cast in as cast-in parts, whereby the arrangement of the reinforcement elements in the concrete provides corresponding space for the prestressing elements and their channels.

Figure 2:
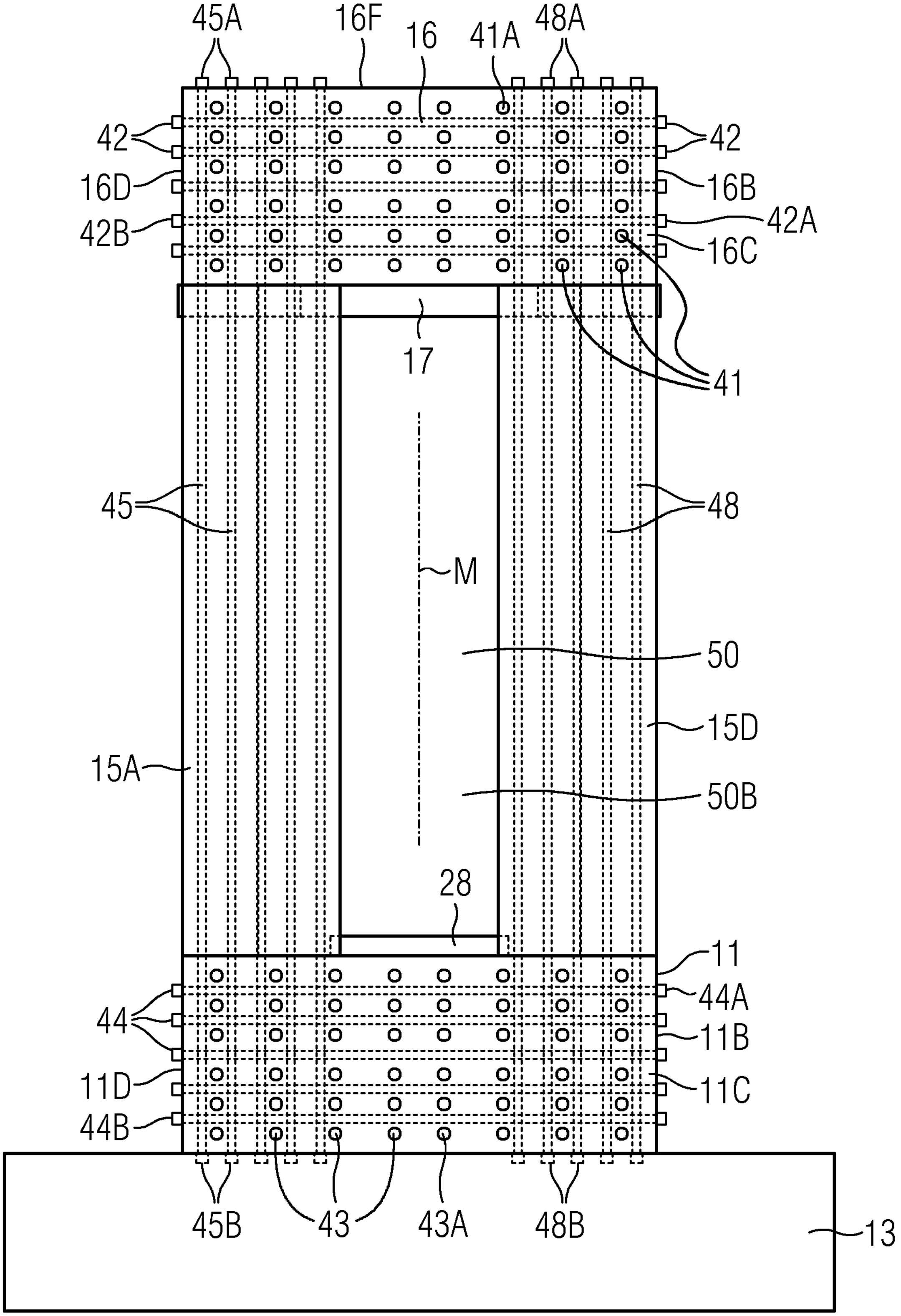
Figure 3:
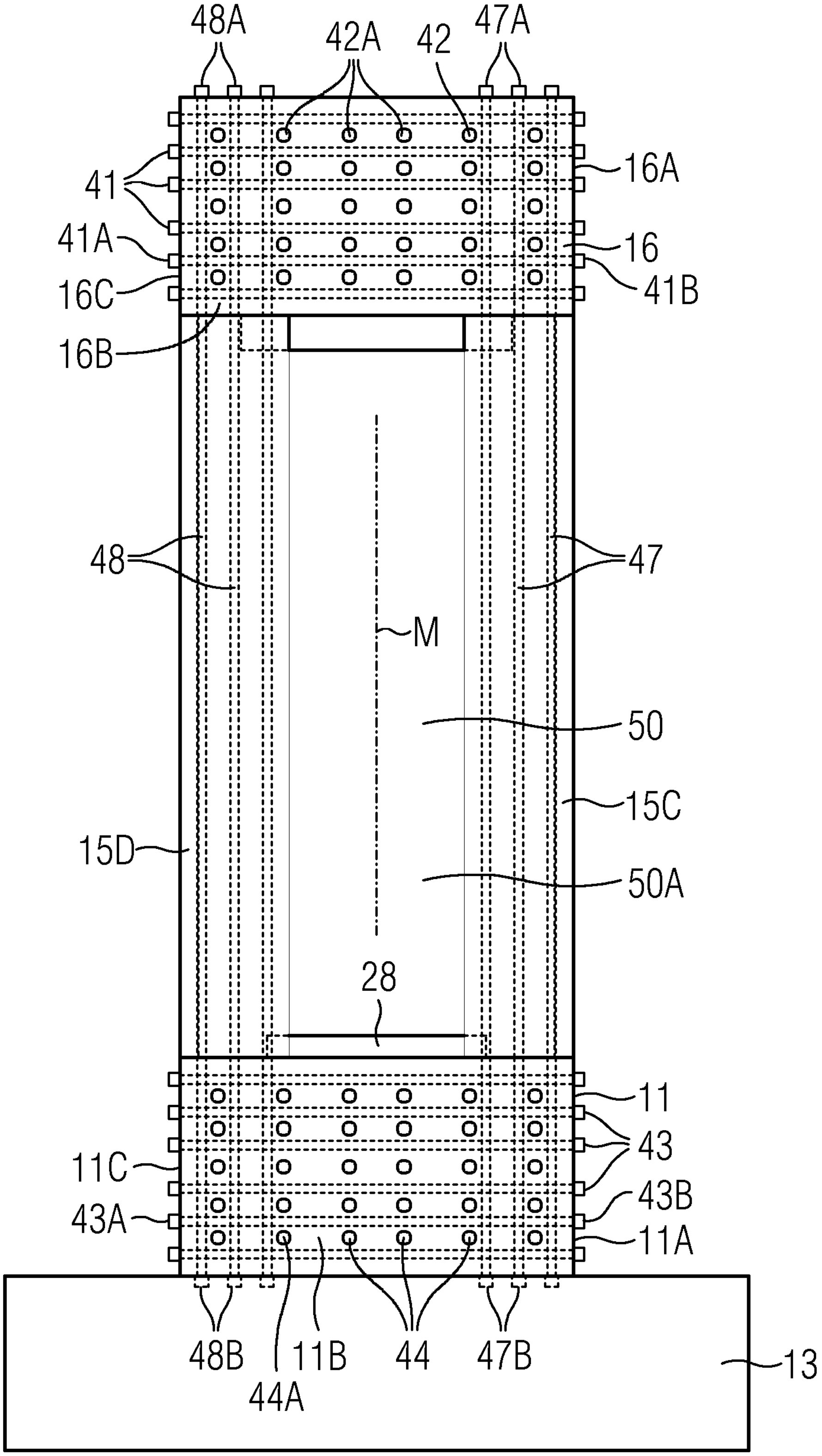

In FIGS. 2 to 4, the uprights 15A to 15D are prestressed in their preferred direction parallel to the central axis M by an arrangement of respective longitudinal prestressing elements 45, 46, 47 and 48, which are in particular parallel to each other and preferably vertical or parallel to the central axis M. The cross-sections of the longitudinal prestressing elements 45 to 48 are, as can be seen in particular in FIG. 4, preferably arranged as uniformly as possible over the horizontal cross-section of the uprights 15A to 15D, in particular fitted in a matrix-like manner in rows and columns in the, for example, pentagonal cross-section of the respective upright. The longitudinal prestressing elements 45 to 48 are fastened to the cross-member upper side 16F with a prestressing anchor 45A to 48A and run through channels, preferably extending parallel to the central axis M, in the cross-member 16, in the uprights 15A to 15D and finally in the frame base 11 and end at the frame base underside and are fastened there with further prestressing anchors 45B to 48B.

By means of the prestressing anchors 45A to 48A and/or 45B to 48B, the longitudinal prestressing elements 45 to 48 are prestressed to respectively predetermined prestresses or prestressing forces. As a result, not only the uprights 15A to 15D, but also the cross-member 16 in its corner regions above the uprights 15A to 15D and the frame base 11 in its corner regions below the uprights 15A to 15D are pretensioned in tension parallel to the central axis M or in vertical direction.

The frame base 11 is now additionally prestressed and stiffened transversely, i.e. transversely or perpendicularly to the central axis M and/or horizontally, preferably crossing in two mutually orthogonal transverse or horizontal preferred directions. To this end, transverse prestressing elements 43 are provided, first in FIG. 2 from front to rear and in FIG. 3 from right to left, extending between two mutually opposite side surfaces 11A and 11C of the frame base 11 generally parallel to each other and preferably perpendicular to the central axis M or horizontally, and provided at their ends located on or protruding from the side surfaces 11A and 11C with respective prestressing anchors 43A and 43B for applying to the prestressing elements 43 a respective associated prestressing force or bias. Further, transverse prestressing elements 44 are provided in FIG. 2 extending from right to left and in FIG. 3 extending from front to rear, between the other two side surfaces 11B and 11D of the frame base 11 facing away from each other, generally parallel to each other and preferably perpendicular to the central axis M or horizontally, and provided at their ends located or protruding from the side surfaces 11B and 11D with respective prestressing anchors 44A and 44B for applying a respective associated prestressing force or bias to the prestressing elements 44.

The cross-sections of the transverse prestressing elements 43 and 44 are, as can be seen in particular in FIGS. 2 and 3, preferably arranged as uniformly as possible over the longitudinal or vertical section of the frame base 11 and fitted into the in particular rectangular section of the frame base 11, in particular arranged in rows and columns in a matrix shape, and each run past or cross the other prestressing elements, the longitudinal prestressing elements 45 to 48 and the crossing transverse prestressing elements 44 or 43. Since, as simulations have shown, the frame base 11 primarily undergoes deformation or deflection downwards in the centre during the forging or pressing process, the transverse prestressing elements provide a high degree of stiffening against such deflection and practically prevent it.

The cross-member 16 is also prestressed and stiffened transversely, i.e. transversely or perpendicularly to the central axis M and/or horizontally, preferably crossing in two mutually orthogonal transverse or horizontal preferred directions, by means of additional transverse prestressing elements 41 and 42. To this end, transverse prestressing elements 41 are provided, first in FIG. 2 from front to rear and in FIG. 3 from right to left, extending between two mutually opposite lateral surfaces 16A and 16C of the cross-member 16, generally parallel to each other and preferably perpendicular to the central axis M or horizontally, and provided at their ends located or protruding from the lateral surfaces 16A and 16C with respective prestressing anchors 41A and 41B for applying to the prestressing elements 41 a respective associated prestressing force or bias. Further, transverse prestressing elements 42 are provided in FIG. 2 extending from right to left and in FIG. 3 extending from front to rear, extending between the other two opposite side surfaces 16B and 16D of the cross-member 16 generally parallel to each other and preferably perpendicular to the central axis M or horizontally, and provided at their ends located or protruding from the side surfaces 16B and 16D with respective prestressing anchors 42A and 42B for applying a respective associated prestressing force or bias to the prestressing elements 42.

The transverse prestressing elements preferably run in several planes perpendicular to the central axis M as shown. Furthermore, the prestressing elements preferably each run in a matrix shape and/or through intermediate spaces which are each bounded by four other prestressing elements. In particular, at least one or two or four longitudinal prestressing element(s) 45, 46, 47 and 48, as shown for example in FIG. 4, extend through an intermediate space formed between two transverse prestressing elements, for example 41, in a respective first one of the planes and two transverse prestressing elements, for example 42, in a respective plane adjacent to the first plane. Furthermore, as shown in particular in FIGS. 2 and 3, in particular at least one or respectively one (or more than one) transverse prestressing element 42 or 44 in a first one of the planes extends through an intermediate space formed between two transverse prestressing elements 41 or 43, respectively, in two planes respectively adjacent to the first plane and two longitudinal prestressing elements 45 to 48.

The cross-sections of the transverse prestressing elements 41 and 42 are, as can be seen in particular in FIGS. 2 and 3, preferably arranged as uniformly as possible over the longitudinal or vertical section of the cross-member 16 and fitted into the in particular rectangular section of the cross-member 16, in particular arranged in matrix form in rows and columns, and each run past the other prestressing elements, the longitudinal prestressing elements 45 to 48 and the crossing transverse prestressing elements 42 and 41 respectively.

The density of the prestressing elements in the composite, i.e. the sum of the cross-sectional areas of the prestressing elements each running in a prestressing direction in relation to the total cross-sectional area of the respective frame section, the cross-sections each being directed or measured perpendicular to the prestressing direction, depends on the desired prestress and tensile strength of the prestressing elements and is generally between 0.1% and 10%. The ratio of the mass proportions of concrete on the one hand and reinforcement and prestressing elements on the other hand can generally be between 0.5% and 15%, in particular between 0.8% and 2.5%.

The desired pretension or pretensioning force is applied to the prestressing elements 41 to 48 via pretensioning devices, not shown, engaging one or both anchors at the ends of each of the longitudinal and transverse prestressing elements 41 to 48.

This is initially done before the forging machine is put into operation with pre-set values (initial pre-tensioning). For this purpose, well-known pre-tensioning devices can be used, which are usually removed again after pre-tensioning.

However, it is also possible to adjust or subsequently set the pre-tension or pre-tensioning force later between forming processes or even during a forming process (post-tensioning). Here, as with pre-tensioning, pre-tensioning devices can be used and removed again, or permanently installed or remaining pre-tensioning devices can be used on the machine frame 12.

In particular, the prestressing in the prestressing elements and thus in the machine frame can be readjusted after its completion according to the respective circumstances and boundary conditions or even dynamically adjusted, in particular changed, for example as a function of predetermined operating parameters during the execution of one or more working cycles or forming operations of the forging machine. For this purpose, a control or monitoring device cooperating with the prestressing devices on the prestressing elements can be provided, which receives operating parameters, in particular machine programmes of the forging machine and can thereby adjust the prestressing as a function of at least one operating parameter of the forging machine. Operating parameters and/or interactions between the forging machine and the foundation body can, for example or alternatively, also be determined by means of sensors or stored in tables or databases, in particular electronically or digitally. On the basis of the operating parameters transmitted or otherwise known, the control device controls the pretensioning devices in such a way that the pretensioning in the machine frame is set accordingly, in particular in a predetermined manner, for the respective operating parameters and/or interactions, or is also readjusted. The pretension to be set for an operating parameter and/or an interaction can be fixed. However, it is also possible that the respective required preload is first determined, in particular calculated, with knowledge of the operating parameters and/or interactions. Operating parameters or operating state variables of the machine and/or interactions can, as already mentioned, also be recorded and/or queried via sensors, in particular via sensors embedded in the concrete, and the like, for example forces and/or accelerations.

However, with such measurement or monitoring, only a monitoring function can be realised. Concrete can continue to harden, even over years, and increase in compressive strength. Therefore, in a special embodiment, the hardening (setting) and dry state of the concrete can be measured over time, preferably with sensors integrated on the machine frame on or in the concrete, such as strain gauges, and then the pretension on the prestressing elements 41 to 48 can be adjusted if necessary.

Preferably, wire ropes are used for at least some or all of the prestressing elements 41 to 48. The wire ropes are made of a plurality of wires guided together, preferably of a metallic material such as steel. The wires may be made by cold drawing and may be coated. A wire rope usually comprises several, for example 3 to 80, strands. The strands may be parallel to each other or also twisted to each other, in particular around a central core. The strands may in particular be formed in accordance with the standard EN 10138-3. Each strand comprises several, for example 3 to 245, in particular 7 to 19, individual wires, the wires preferably being twisted, in particular around a central core of the strand. The diameter of a wire rope may be, for example, between 40 mm and 300 mm. The tensile or rope strength of the wire rope is somewhat lower than the sum of the tensile strengths of the individual strands and is typically in a range of values around about 400 to 2000 $N/mm^2$. In addition to steel, other materials can also be incorporated into the wire rope, for example high-tensile plastic fibres or inserts or sheaths. The structure of the wire ropes is chosen in particular depending on the desired tensile strength and the available cross-section in the frame, preferably within the framework of DIN EN 12385.

An active pretensioning device for tensioning the wire rope may be provided at one of the ends of the wire rope and a passive tensioning device, which only holds the wire rope at the end, may be provided at the other end. Preferably, an active tensioning device is provided at both ends of the wire rope.

In addition to wire ropes, tie rods or fibre ropes can also be used as prestressing elements.

The pretension of the prestressing elements 41 to 48 can be adjusted in particular by actuation on one or both anchors mechanically by means of tools or by means of electric motor(s) or also by means of hydraulic actuators, namely once to a fixed value or also subsequently adjustable. In the case of wire ropes as prestressing elements, for example, a hydraulic or mechanical actuating device known per se from the company STS Systems can be used, which is not described in more detail here.

The design of the machine frame 12 at least partially with prestressed concrete has, in addition to the advantage of a simpler and faster installation and completion on site and simpler transport, also the advantage that, with the same strength, the frame parts made of the prestressed and reinforced concrete are significantly heavier than corresponding frame parts made of grey cast iron or steel and thus the static prestressing acting in the machine frame due to the dead weight of the frame parts (frame components) is already higher per se and can counteract the reaction forces during forming.

The machine frame 12 made of the prestressed concrete can be formed with very large dimensions and load-bearing capacities and is therefore particularly suitable for very large forging machines with very high forming forces, which are required for particularly voluminous solid forming and/or particularly difficult-to-form materials with high forming resistance, e.g. for hydraulic forging presses with correspondingly high pressing force.

For example, for a large hydraulic forging press with a pressing force of 30,000 t, a machine frame (press frame) 12 with the structure according to the invention made of steel would typically weigh about 6000 t and made of the reinforced and prestressed concrete would typically weigh about 10,000 t of concrete and additionally about 130 t of steel.

LIST OF REFERENCE SIGNS

10 Forging machine
11 Frame base
11A to 11D Side surface
12 Machine frame
13 Foundation
15 Frame support
15A to 15D Upright
16 Cross-member
16A to 16D Side surface
16E Cross-member underside
16F Cross-member upper side
17 Support plate
17A to 17D Support plate section
22 Drive system
23 Drive cylinder
24 First forming tool
25 Guide cylinder
26 First tool carrier (ram)
28 Second tool carrier
30 Second forming tool
31 Holding and positioning device
33 Fastening device
41 Transverse prestressing elements
42 Transverse prestressing elements
43 Transverse prestressing elements
44 Transverse prestressing elements
45, 46, 47, 48 Longitudinal prestressing elements
45A, 47A, 48A Prestressing anchor
45B,47B,48B Prestressing anchor
50 Working space
50A to 50D Side space
52 Transport device
60, 61, 62 Inner surface
63, 64 Outer surface
M Central axis

We claim:

1. A forging machine for forging workpieces, comprising:
a) a first tool carrier and a second tool carrier,
b) a drive system for driving at least the first tool carrier in a working movement along a, preferably vertical, central axis (M) towards or away from the second tool carrier,
c) and a machine frame on or at which the drive system is held and preferably also the second tool holder is held,
d) wherein the machine frame is formed at least predominantly of a concrete prestressed with prestressing elements,
e) wherein the machine frame comprises a frame base and a frame support connected to the frame base and extending upwards from the frame base, and a cross-member connected with the frame support and arranged on a side of the frame support facing away from the frame base,
f) wherein longitudinal prestressing elements are provided which extend at least predominantly parallel to the central axis (M) and each extend through the frame support and through the frame base and also through the cross-member,
g) wherein transverse prestressing elements are provided both in the frame base and in the cross-member, each of which extends at least predominantly orthogonal to the longitudinal prestressing elements,
h) wherein the longitudinal prestressing elements and the transverse prestressing elements are each provided with prestressing anchors for the application of a respective associated prestressing force or bias, and
i) wherein the prestressing anchors are each arranged on an outer surface of the frame base or the cross-member
i) wherein the transverse prestressing elements in the frame base are arranged in more than two planes, which planes are directed perpendicularly to the central axis (M),
k) wherein the transverse prestressing elements in the cross-member are arranged in more than two planes, which planes are directed perpendicularly to the central axis (M),
l) wherein the transverse prestressing elements in one or each of the planes extend and cross at least predominantly orthogonally or in at least approximately orthogonal preferred directions to the transverse prestressing elements in at least one adjacent plane, and m) wherein at least one longitudinal prestressing element passes through an intermediate space formed between two transverse prestressing elements in a respective first one of the planes and two transverse prestressing elements in a respective plane adjacent to the first plane and wherein at least one transverse prestressing element in a first one of the planes passes through an intermediate space formed between two transverse prestressing elements in two respective planes adjacent to the first plane and two longitudinal prestressing elements.

2. The forging machine according to claim 1, wherein:

a) the transverse prestressing elements in the frame base are divided into at least two groups of transverse prestressing elements, the transverse prestressing elements of one group extending and crossing at least predominantly orthogonally or in at least approximately orthogonal preferred directions the transverse prestressing elements of the other group and/or b) the transverse prestressing elements in the cross-member are divided into at least two groups of transverse prestressing elements, the transverse prestressing elements of one group extending and crossing at least predominantly orthogonally or in at least approximately orthogonal preferred directions the transverse prestressing elements of the other group.

3. The forging machine according to claim 1, wherein:

a) the cross-sections of the longitudinal prestressing elements and/or of the transverse prestressing elements are arranged substantially uniformly over the corresponding cross-section of the machine frame and/or are arranged in matrix form and/or b) a density of the prestressing elements, i.e. the sum of the cross-sectional areas in relation to the total cross-sectional area of the respective frame section, is selected depending on the desired pretension and tensile strength of the prestressing elements and/or is selected be-tween 0.1% and 10%. and/or c) a mass ratio of concrete on the one hand and prestressing elements on the other hand is generally chosen between 0.5% and 15%, and/or the prestressing elements are formed from a steel material.

4. The forging machine according to claim 1, wherein:

a) a pretension and arrangement of the prestressing elements are calculated by computer-aided simulations of reaction forces during a forging process, the prestressing elements being provided in particular in such a thickness and density and arrangement and being individually prestressed by means of the prestressing anchors in such a way that tensile stresses or deformations in the machine frame acting on the concrete during a forming process which are determined during the simulation are at least largely or even completely avoided, so that the concrete is only loaded in compression, and/or b) a pretension of the prestressing elements is set according to preset values within a framework of pretensioning individually via associated pretensioning anchors, or is subsequently adjusted within a framework of post-tensioning and/or can be monitored or continuously measured by means of measuring devices.

5. The forging machine according to claim 1, wherein:

guide channels and receptacles for the prestressing elements, are provided in the concrete of the machine frame, and/or for at least some or all of the prestressing elements, wire ropes are provided which are formed from a plurality of wires of a metallic material such as steel, and which are guided together, and a wire rope comprising a plurality of strands, which can be parallel to one another or also twisted with respect to one another about a central core, each strand comprising a plurality of individual wires which are parallel to one another or also twisted to one another, about a central core.

6. The forging machine according to claim 1, wherein:

the second tool carrier is arranged on or at the frame base, in particular and can be adjusted to a desired position by means of a holding and positioning device and possibly-a measuring device; and/or the frame base stands on or is connected to a machine foundation; and/or the frame base is at least approximately in the form of a straight prism with a polygonal base, in particular a cuboid.

7. The forging machine according to claim 1, wherein:

the frame support comprises several uprights extending upwards from the frame base at the corner regions thereof, which are arranged around a working space which is bounded upwards by a first tool support and downwards by a second tool support;

side spaces, which are in each case arranged between two of the uprights, adjoin the working space preferably outwardly as seen from the central axis (M); and in particular the first tool carrier is adapted in its outer contour to the shape of the working space and the adjoining side spaces and partially projects into the side spaces.

8. The forging machine according to claim 7, wherein the uprights have flat, inner surfaces facing the central axis (M) or corners of the second tool carrier and delimiting the working space and arranged at a same distance from the central axis (M) and on a straight prism with a regularly polygonal square or octagonal, base surface around the central axis (M), wherein further flat, inner surfaces of the uprights adjoin on both sides of the inner surfaces pointing towards the central axis (M) each at an obtuse angle.

9. The forging machine according to claim 7, wherein the uprights are each formed at least approximately in the shape of a straight prism with a pentagonal horizontal base and/or with two vertical outer surfaces arranged at right angles to one another and/or extending upwards in continuation of side surfaces of the frame base, and three vertical inner surfaces.

10. The forging machine according to claim 7, wherein longitudinal prestressing elements run through each upright, but no transverse prestressing elements.

11. The forging machine according to claim 8, wherein the cross-member connects and stiffens the uprights and/or in which the cross-member is at least approximately in the form of a straight prism with a polygonal base.

12. The forging machine according to claim 1, wherein:

drive units of the drive system, which are coupled to the first tool carrier, are arranged or held on the cross-member underside via a carrier plate, the drive units and/or the carrier plate projecting at least partially outwards into the side spaces between the uprights, and fastening devices for the drive units are accessible and fixable or detachable on a cross-member upper side of the cross-member, wherein the fastening devices run vertically through the cross-member and are formed with traction elements with clamping elements or traction rods with threads and fastening nuts, vertically, and are formed with traction elements with clamping elements or traction rods with threads and fastening nuts, wherein the drive units can be removed downwards together with the associated fastening device by loosening the fastening nuts or clamping elements.

13. The forging machine according to claim 1, wherein:

parts of the machine frame or the entire machine frame are made of a flowable or pasty and subsequently hardening concrete mixture of binder and fillers (or: aggregates, additives) and mixing liquid comprising one or more of water and an additive, wherein the additive comprises one or more of a superplasticizer and setting accelerator, wherein the binder is at least a hydraulic binder, and/or at least a latent hydraulic binder and/or at least a non-hydraulic binder\, and wherein mineral grains are provided as fillers, and/or the concrete for the machine frame is designed as reinforced concrete with reinforcing elements made of steel or solid plastics or carbon, and/or added fibres made of steel, plastic or glass or mats or woven or knitted fabrics, and/or individual frame parts or sections of the machine frame, are prefabricated parts which have been connected to one another monolithically at the installation site, with connecting concrete and/or the prestressing elements and/or connecting elements.

14. The-forging machine according to claim 1, wherein the forging machine is a forging press machine.

15. The forging machine according to claim 1, the prestressing anchors for the application of a respective associated prestressing force or bias are provided at respective ends of the longitudinal prestressing elements and the transverse prestressing elements.

16. The forging machine according to claim 3, wherein the mass ratio of concrete on the one hand and prestressing elements on the other hand is between 0.8% and 2.5%.

17. The forging machine according to claim 5, wherein guide channels and receptacles for the prestressing elements comprise tubes or corrugated tubes.

18. The forging machine according to claim 8, wherein the obtuse angle is about 135°.

19. The forging machine according to claim 11, wherein the polygonal base is cuboidal.

20. The forging machine according to claim 13, wherein the parts of the machine frame made of a flowable or pasty and subsequently hardening concrete mixture of binder and fillers (or: aggregates, additives) and mixing liquid comprise the frame base, the uprights and/or the cross-member.

21. The forging machine according to claim 13, wherein the hydraulic binder comprises cement.

22. The forging machine according to claim 13, wherein the non-hydraulic binder comprises a synthetic resin.

23. The forging machine according to claim 13, wherein the mineral grains comprise one or more of sand, gravel, and chippings or recycled materials having a selected strength.

* * * * *